Oct. 30, 1962     D. A. WALTHER     3,061,377
RIM AND WHEEL ASSEMBLIES
Filed May 11, 1960     2 Sheets-Sheet 1

INVENTOR.
DANIEL A. WALTHER
BY Ely, Frye & Hamilton
ATTORNEYS

Oct. 30, 1962  D. A. WALTHER  3,061,377
RIM AND WHEEL ASSEMBLIES
Filed May 11, 1960  2 Sheets-Sheet 2

INVENTOR.
DANIEL A. WALTHER
BY Ely, Frye & Hamilton
ATTORNEYS 3,061,377
Patented Oct. 30, 1962

3,061,377
RIM AND WHEEL ASSEMBLIES
Daniel A. Walther, Dayton, Ohio, assignor to The Dayton Steel Foundry Company, Dayton, Ohio, a corporation of Ohio
Filed May 11, 1960, Ser. No. 28,329
5 Claims. (Cl. 301—13)

The present invention relates to rim and wheel assemblies. More particularly, the invention relates to improvements in wheel and rim constructions providing a more effective mounting of rims in dual fashion on a wheel and maintaining a positive driving connection between the dual rims and the wheel on which they are mounted.

A dual rim and wheel assembly includes the wheel attached to the vehicle axle. The wheel has a plurality of radially extending spokes each of which terminates in a felly surface. An "inner" rim is seated on the axially inner portion of the felly surface and an interchangeable "outer" rim is seated on the axially outer portion of the felly surface. A separating means such as an annular spacer band is located between the rims to provide working clearance for tires mounted on the rims. The assembly of inner rim-spacer band-outer rim is secured to the wheel by fastening means such as bolt supported clamp lugs.

The general object of the invention is to provide an improved rim and wheel construction so that each rim will seat in a definite and predetermined position on the wheel.

A further object of the invention is to provide a rim construction including one or more spaced lugs thereon for positive engagement of the rim with either the axially inner portion of the wheel or the bolt supported fastening means.

These and other objects of the invention, as well as the advantages thereof, over existing and prior art forms, will be apparent in view of the following detailed description and the attached drawings.

Figure 1:
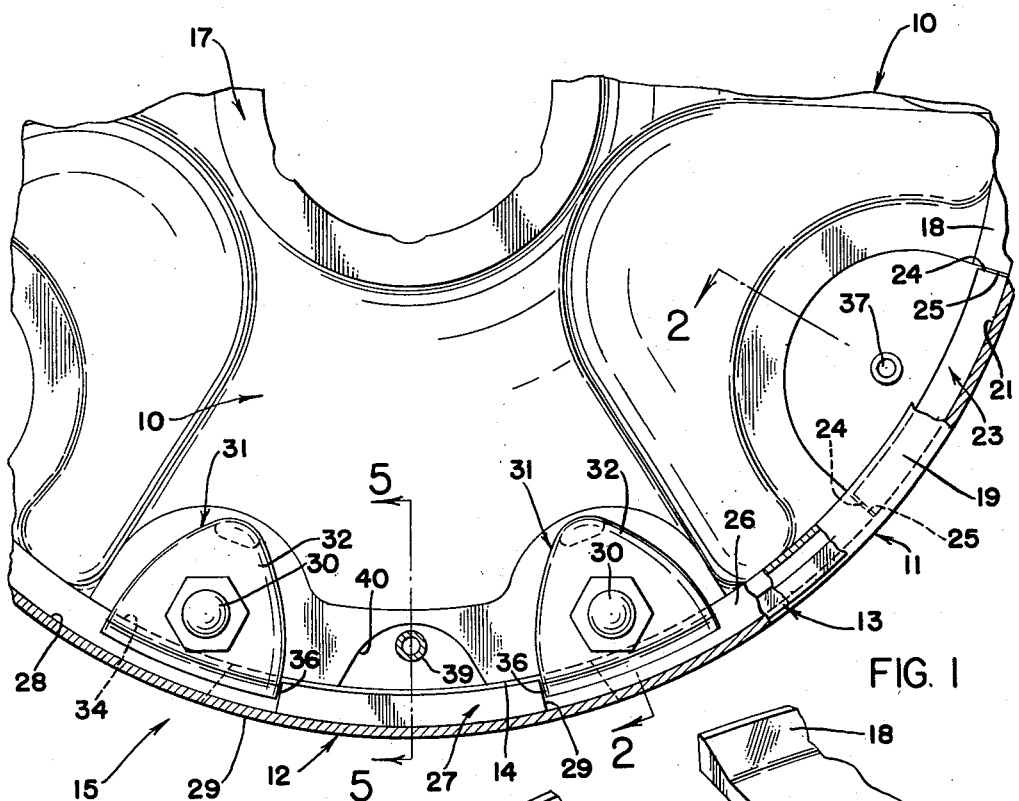
Figure 3:
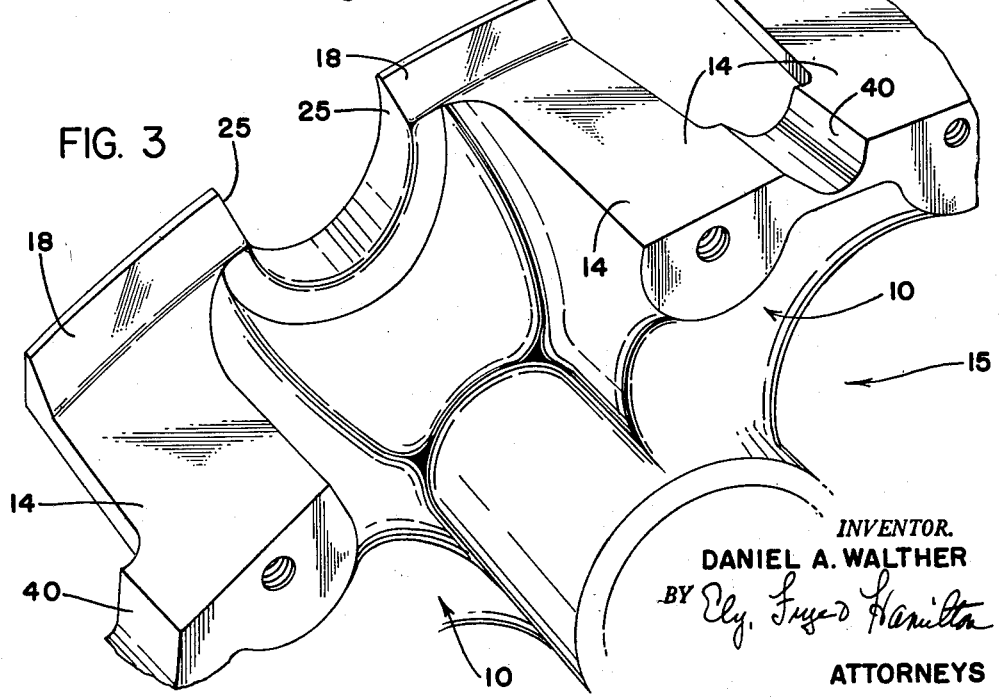
Figure 4:
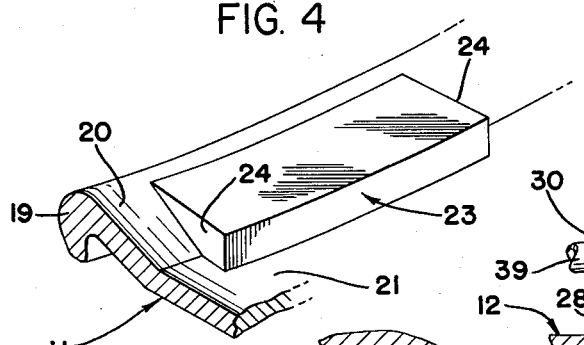
Figure 5:
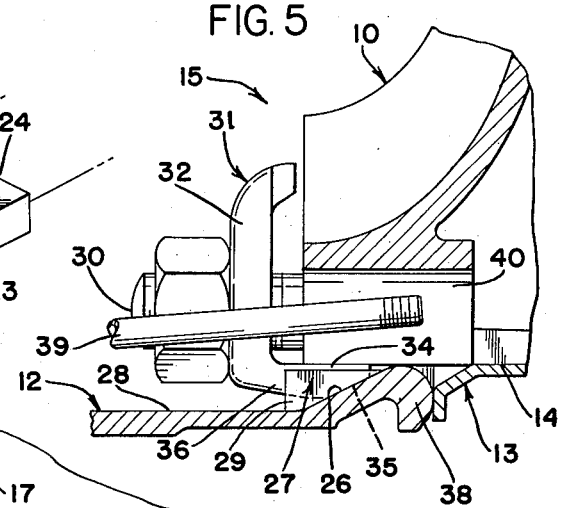
Figure 2:
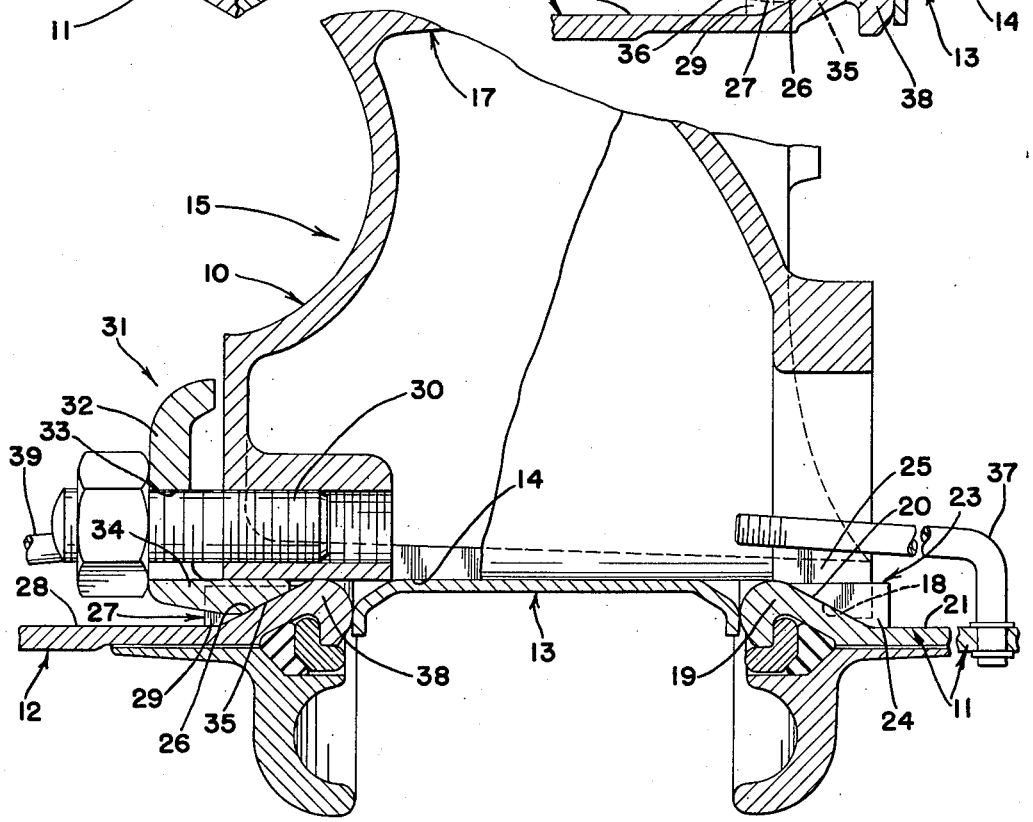

Referring to the drawings:
FIG. 1 is a partial elevation, partially broken away, of a rim and wheel assembly according to the invention;
FIG. 2 is a partial sectional view taken substantially as indicated on line 2—2 of FIG. 1;
FIG. 3 is a partial perspective of a wheel according to the invention showing the span between adjacent spoke members;
FIG. 4 is a partial perspective of a rim according to the invention showing the driving lugs;
FIG. 5 is a partial sectional view taken substantially as indicated on line 5—5 of FIG. 1.

An improved rim and wheel assembly according to the invention includes the wheel with a felly surface on the outward ends of any desired number of spoke members extending radially from a hub area. The axially inner portion of each felly surface has a radially outwardly inclined rim mounting surface defined by the axially outer face of a flange on the radially outermost portion of the felly surface. The inner rim has at least one mounting flange with surfaces conforming to the inclined rim mounting surface. The inner rim flange also has one or more driving lugs conforming in circumferential dimension to the span between the outward ends of adjacent spoke members. The inner rim will therefore be seated in a definite and predetermined position on the wheel felly surface.

When the inner rim is mounted on the axially inner portion of the felly surface, an annular spacer band is seated on the medial portion of the felly surface. The outer rim, which preferably has the same form of mounting flange as the inner rim, is mounted on the axially outer portion of the felly surface adjacent the spacer band. The inner rim-spacer band-outer rim are secured to the wheel by a series of bolt supported clamp lugs. The lateral or axially inner portion of each clamp lug has a radially outward end portion conforming with the flange of the outer rim. The outer rim flange also has a series of driving lugs conforming, in circumferential dimensions, to the span between the adjacent clamp lugs. For complete interchangeability of rims, the span between the adjacent spoke members may be equal to the span between the adjacent clamp lugs on each spoke member. When the lugs are tightened, both rims will be securely fastened and maintained in accurate alignment.

In the drawings, a representative spoke member is indicated generally by the numeral 10. Referring specifically to FIGS. 1 and 2, an inner rim 11 and an interchangeable outer rim 12, separated by an annular spacer band 13, are mounted in operative position on felly surface 14 of a wheel, indicated, generally by the numeral 15. The wheel 15 may have any desired number of spoke members extending from a conventional hub area 17. The free ends of said spoke members 10 terminate in the felly surface 14, which, as shown, is bifurcated toward the axially inner portion thereof.

The inner rim 11 is carried on a standard (e.g. 28°) radially outwardly inclined rim mounting surface 18 on the axially inner portion of the felly surface 14. The diameter of the gutter flange portion 19 of rim 11 is preferably chosen so that the rim will seat on the rim mounting surface 18 near to or adjacent the felly 14. Radially outwardly of the gutter flange portion 19 is an axially inner inclined surface 20 conforming with felly rim mounting surface 18. However, it will be noted that the inclined surface 20 is longer than its mating surface 18 to provide a clearance for the medial surface 21 of the rim 11 over the radially outermost portion of mounting surface 18.

As best shown in FIG. 4, one or more driving lugs, indicated generally at 23, extend axially of the rim surface 20 onto medial surface 21. The ends walls 24 of each lug 23 are substantially perpendicular to the rotational axis of the wheel. End walls 24 conform to the opposed radially outer side walls 25, as shown in FIG. 3, of consecutive spoke members 10 so that lug 23 is insertable therebetween to provide a positive driving connection between the wheel 15 and the inner rim 11.

The outer rim 12 has a mounting flange preferably identical to that of the inner rim 11. The gutter flange 38 has a diameter such that the rim 12 will seat near or adjacent to the axially outer portion of the felly surface 14. The surface 26 extending radially outwardly of the gutter flange portion 38 is inclined at a standard (e.g. 28°) angle. Also, preferably identical with the inner rim 11, the outer rim 12 has one or more driving lugs, indicated generally at 27, extending axially of the rim surface 26 onto medial surface 28. The end walls 29 of each lug 27 are substantially perpendicular to the rotational axis of the wheel.

The axially outer portion of each spoke member 10 is of conventional construction, being provided with supporting means comprising one or more bosses each carrying stud bolts 30 for attachment of the fastening means such as the clamp lugs indicated generally at 31. Each clamp lug 31 has a radially oriented upright leg 32 with a slot 33 for the supporting bolt 30. The axially oriented horizontal leg or lateral portion 34 of clamp 31 has an axially inward radially inclined conical surface 35 for wedging engagement with surface 26 of the outer rim 12.

The axially outer sides of lateral portion 34 and the radially outer sides of upright leg 32 comprise side drive walls 36 of clamp lug 31. Drive walls 36 preferably are substantially perpendicular to the rotational axis of the wheel. The opposed drive walls 36 on consecutive clamp lugs 31 conform to the end walls 29 of each lug 27 on outer rim 12 so that they will position therebetween to provide a positive driving connection between the wheel 15 and the outer rim 12.

To permit complete interchangeability of rims, the span between drive walls 36 on adjacent lugs 31 is preferably equal to the span between the side walls 25 of adjacent spoke members 10.

A rim and wheel assembly according to the invention also provides a means to assure access to the valve stem 37 on inner rim 11. By placing the lugs 23 on rim 11 so that stem 37 will position medially of the free ends of spoke members 10, the stem 37 is readily accessible for inflation or deflation when rim 11 is operatively mounted on wheel 15.

As can be seen, the stem 37, on the inner rim 11, is directed generally axially outwardly of the rim toward the gutter flange 19. Similarly, the stem 39, on the outer rim 12, is directed axially inwardly of the rim toward gutter flange 38. Although stem length has not been completely standardized by rim manufacturers the longest stem currently being manufactured extends to or slightly past the gutter flange.

Since it is desirable to provide for interchangeability of rims, airing channel 40, as shown in FIGS. 1 and 3, is provided on the axially outer portion of felly surface 14 on each spoke member 10. In this way, the stem 39 and driving lugs 27 on the outer rim will position medially of the clamp lugs 31 in the same manner as the stem 37 on inner rim 11 positions medially of the free ends of spoke members 10.

From the above description, it will be apparent that a wheel and rim assembly according to the invention provides for the positive mounting of interchangeable dual rims on a wheel so that each rim will have a positive driving connection to the wheel on which it is mounted.

What is claimed is:

1. The combination of a wheel having free ended spoke members having an axially outer face, a felly surface on the free ends of said spoke members, interchangeable inner and outer rims adapted to be mounted on said felly surface, spacer means for separating said rims, each of said rims having a driving lug, opposed radially outer side walls on consecutive spoke members, said inner rim driving lug engaging said opposed radially outer side walls, dual supporting means on said outer face of each of said spoke members, clamp lugs demountably secured to each of said supporting means for mounting said outer rim, spacer means and inner rim to said wheel, said clamp lugs on each of said spoke members having opposed drive walls, said outer rim driving lug engaging said opposed drive walls, the span between said opposed drive walls being equal to the span between said opposed radially outer side walls.

2. The combination of a wheel having free ended spoke members having an axially outer face, a felly surface on the free ends of said spoke members, said felly surface having an axially inner portion with a radially outwardly inclined mounting surface, interchangeable inner and outer rims, said inner rim having a mounting flange with a radially inwardly inclined mounting surface, spacer means for separating said rims, each of said rims having a driving lug, said inner rim driving lug extending axially inward of said inwardly inclined mounting surface, opposed radially outer side walls on consecutive spoke members, said inner rim driving lug engaging said opposed radially outer side walls, dual supporting means on said outer face of each of said spoke members, clamp lugs demountably secured to each of said supporting means for mounting said outer rim, spacer means and inner rim to said wheel, said clamp lugs on each of said spoke members having opposed drive walls, said outer rim driving lug engaging said opposed drive walls, said outwardly inclined mounting surface on said felly and said inwardly inclined mounting surface on said inner rim engaged when said inner rim is operatively mounted on said wheel, the span between said opposed drive walls being equal to the span between said opposed radially outer side walls.

3. The combination of a wheel having free ended spoke members having an axially outer face, a felly surface on the free ends of said spoke members, said felly surface having an axially inner portion with a radially outwardly inclined mounting surface, interchangeable inner and outer rims having opposed mounting flanges, each of said mounting flanges on said rims having a radially inwardly inclined mounting surface, spacer means for separating said rims, each of said rims having a driving lug, said driving lug on said inner rim extending axially inward of said inwardly inclined mounting surface, said driving lug on said outer rim extending axially outward of said inwardly inclined rim mounting surface, opposed radially outer side walls on consecutive spoke members, said inner rim driving lug engaging said opposed radially outer side walls, dual fastening means on said outer face of each of said spoke members having opposed drive walls, each said clamp lug having a lateral portion with an axially inner radially inclined surface, said outer rim driving lug engaging said opposed drive walls, said outwardly inclined mounting surface on said felly and said inner rim mounting surface, said spacer means and said rim mounting flanges, said clamp lug inclined surface and said outer rim inclined surface, each being respectively engaged when said outer rim, spacer means and inner rim are operatively mounted on said wheel, the span between said opposed drive walls being equal to the span between said opposed radially outer side walls.

4. The combination of a wheel having free ended spoke members having an axially outer face, a felly surface on the free ends of said spoke members, said felly surface having a bifurcated axially inner portion with a radially outwardly inclined mounting surface and an axially disposed airing channel between said outer face and said bifurcated inner portion, interchangeable inner and outer rims having opposed mounting flanges, each of said mounting flanges on said rims having a radially inwardly inclined mounting surface, spacer means for separating said rims, each of said rims having a driving lug, said driving lug on said inner rim extending axially inward of said inwardly inclined mounting surface, said driving lug on said outer rim extending axially outward of said inwardly inclined mounting surface, opposed radially outer side walls on consecutive spoke members, said inner rim driving lug engaging said opposed radially outer side walls, dual fastening means on said outer face of each of said spoke members, one fastening means on each side of said airing channel, clamp lugs supported by said fastening means for securing said outer rim, spacer means and inner rim to said wheel, said clamp lugs on each of said spoke members having opposed drive walls, each said clamp lug having a lateral portion with an axially inner radially inclined surface, said outer rim driving lug engaging said opposed drive walls, said outwardly inclined mounting surface and said inner rim mounting surface, said spacer means and said rim mounting flanges, said clamp lug inclined surface and said outer rim inclined surface, each being respectively engaged when said outer rim, spacer means and inner rim are operatively mounted on said wheel, the span between said opposed drive walls being equal to the span between said opposed radially outer side walls.

5. A wheel for mounting dual rims having three free ended spoke members, each said spoke member having an axially outer face, a felly surface on the free ends of said spoke members, said felly surface having a bifurcated axially inner portion with a radially outwardly inclined mounting surface and an axially disposed airing channel between said outer face and said bifurcated inner portion, opposed radially outer side walls on consecutive spoke members and circumferentially spaced dual bolts on said outer face of each said spoke member.

References Cited in the file of this patent

UNITED STATES PATENTS

| | | |
|---|---|---|
| 1,827,792 | Keller | Oct. 20, 1931 |
| 1,884,936 | Walther | Oct. 25, 1932 |
| 2,023,404 | Burger | Dec. 10, 1935 |
| 2,164,772 | Keller | July 4, 1939 |
| 2,478,803 | Ash | Aug. 9, 1949 |
| 2,767,026 | Walther | Oct. 16, 1956 |
| 2,819,118 | Fahlman et al. | Jan. 7, 1958 |
| 2,846,268 | Hunt | Aug. 5, 1958 |
| 2,911,255 | Bellairs | Nov. 3, 1959 |